(12) United States Patent
Shigeta et al.

(10) Patent No.: US 10,518,639 B2
(45) Date of Patent: Dec. 31, 2019

(54) AUXILIARY DRIVE DEVICE

(71) Applicant: JTEKT CORPORATION, Osaka-shi (JP)

(72) Inventors: Ryohei Shigeta, Anjo (JP); Hiroshi Sumasu, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/008,163

(22) Filed: Jun. 14, 2018

(65) Prior Publication Data

US 2018/0370356 A1    Dec. 27, 2018

(30) Foreign Application Priority Data

Jun. 21, 2017   (JP) ................................ 2017-121375

(51) Int. Cl.
| | |
|---|---|
| *F16D 11/00* | (2006.01) |
| *B60K 23/08* | (2006.01) |
| *F16D 23/02* | (2006.01) |
| *F16D 11/14* | (2006.01) |
| *F16D 27/118* | (2006.01) |

(52) U.S. Cl.
CPC .......... *B60K 23/0808* (2013.01); *F16D 11/14* (2013.01); *F16D 23/02* (2013.01); *F16D 27/118* (2013.01); *F16D 2011/008* (2013.01)

(58) Field of Classification Search
CPC ... B60K 23/0808; F16D 27/118; F16D 11/14; F16D 23/02; F16D 2011/008
See application file for complete search history.

(56) References Cited

U.S. PATENT DOCUMENTS

| | | | | |
|---|---|---|---|---|
| 7,354,374 | B2* | 4/2008 | Teraoka | F16H 48/08 |
| | | | | 475/231 |
| 9,989,140 | B2* | 6/2018 | Onitake | F16D 27/09 |
| 2003/0054913 | A1 | 3/2003 | Sayama | |
| 2017/0008396 | A1* | 1/2017 | Takaishi | F16D 13/74 |
| 2017/0028843 | A1* | 2/2017 | Ogawa | B60K 17/344 |
| 2017/0166053 | A1* | 6/2017 | Ogawa | B60K 23/08 |
| 2018/0283465 | A1* | 10/2018 | Hirao | F16D 11/14 |
| 2019/0195291 | A1* | 6/2019 | Eisl | F16D 11/14 |

FOREIGN PATENT DOCUMENTS

JP       2003-80962       3/2003

* cited by examiner

*Primary Examiner* — David J Hlavka
(74) *Attorney, Agent, or Firm* — Oblon, McClelland, Maier & Neustadt, L.L.P.

(57) ABSTRACT

An auxiliary drive device includes: a drive unit that has an electric motor; a meshing clutch that has a first meshing member and a second meshing member; an actuator that moves the second meshing member; and a control unit that controls the electric motor and the actuator. The actuator moves the second meshing member among a separation position, at which the second meshing member is not meshed with the first meshing member, an abutment position, at which first meshing teeth and second meshing teeth possibly abut against each other, and a meshing position, at which the first meshing teeth and the second meshing teeth are meshed with each other. The control unit makes a current supplied to the electric motor when the second meshing member is located between the abutment position and the meshing position smaller than a current required to maintain the rotational speed of the electric motor.

4 Claims, 7 Drawing Sheets

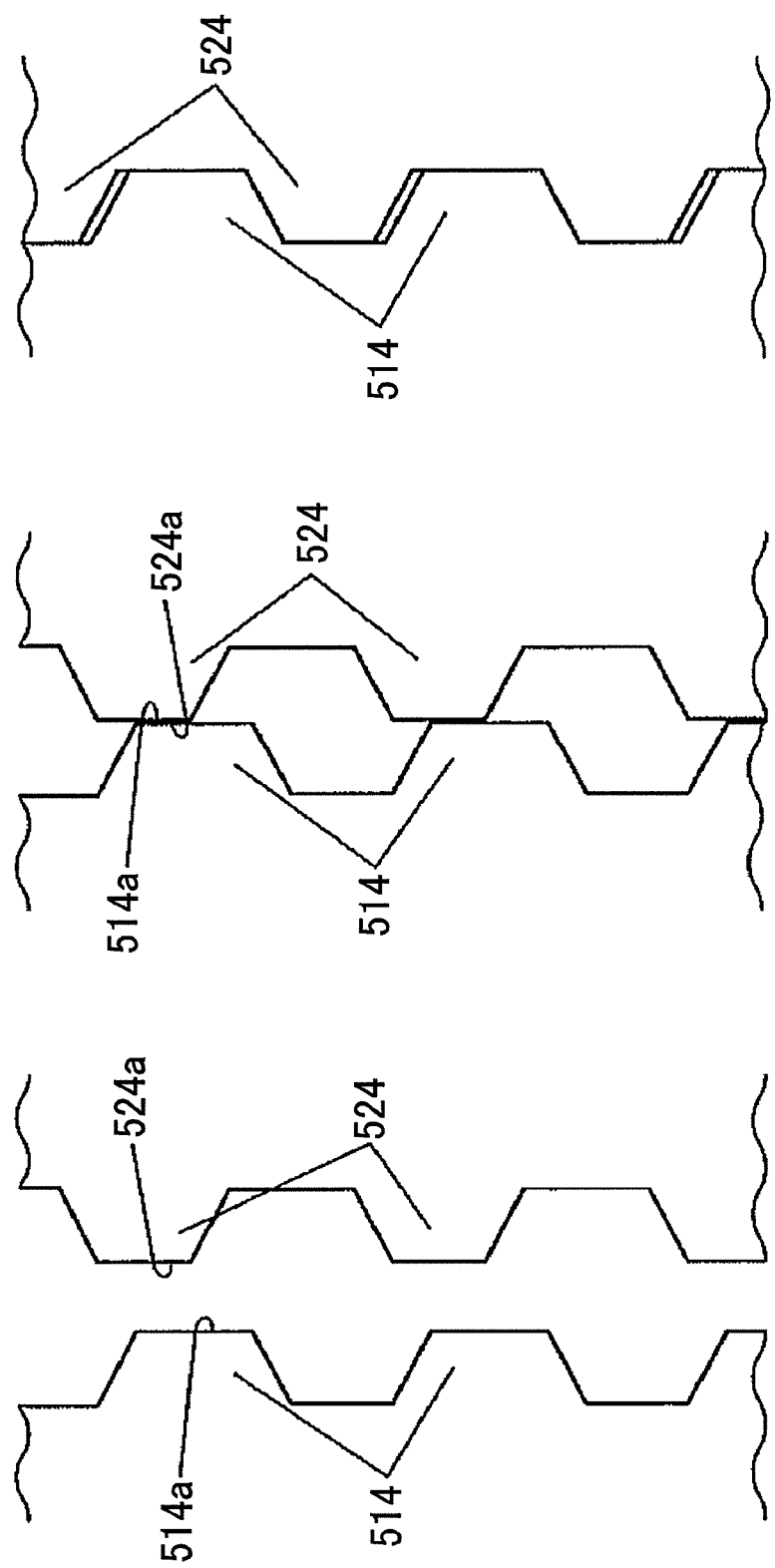

AUXILIARY DRIVE DEVICE

INCORPORATION BY REFERENCE

The disclosure of Japanese Patent Application No. 2017-121375 filed on Jun. 21, 2017 including the specification, drawings and abstract is incorporated herein by reference in its entirety.

BACKGROUND OF THE INVENTION

1. Field of the Invention

The present invention relates to an auxiliary drive device for a vehicle.

2. Description of the Related Art

In some four-wheel-drive vehicles according to the related art, main drive wheels are driven by a drive force of an engine, the speed of which is varied by a transmission, and auxiliary drive wheels are driven by an auxiliary drive device that has an electric motor. See Japanese Patent Application Publication No. 2003-80962 (JP 2003-80962 A), for example.

In such four-wheel-drive vehicles, a clutch is provided in a drive force transfer path for the electric motor in the auxiliary drive device, and a four-wheel-drive state in which both the main drive wheels and the auxiliary drive wheels are driven with the clutch engaged is established when a large drive force is required when the vehicle speed is in the low to medium speed range. In the case where the vehicle speed is in the high speed range, or when a large drive force is not required even if the vehicle speed is in the low to medium speed range, on the other hand, a two-wheel-drive state in which the electric motor is stopped and the clutch is disengaged is established. With the clutch disengaged in this way, a power loss caused when the electric motor is rotated by a rotational force of the auxiliary drive wheels in the two-wheel-drive state, damage to the electric motor due to a centrifugal force generated when a rotor of the electric motor is rotated at a high speed in the high speed range, etc. are suppressed.

In the power transfer device for an electric motor described in JP 2003-80962 A, the clutch is constituted of a multi-plate clutch in which a plurality of clutch plates are arranged in the axial direction, and the multi-plate clutch is pressed by a cam thrust force of a ball cam mechanism that operates upon receiving a rotational force transferred via an electromagnetic clutch.

In the four-wheel-drive vehicle configured as described above, when the main drive wheels slip during travel in the two-wheel-drive state, for example, it is necessary that the auxiliary drive device should immediately be actuated to drive the auxiliary drive wheels. In the device described in JP 2003-80962 A, however, it takes time before the electromagnetic clutch is engaged to actuate the ball cam mechanism and a friction force is generated between the clutch plates with the multi-plate clutch pressed by the cam thrust force. This elongates an actuation delay time, namely, from when switching to the four-wheel-drive state is required until the auxiliary drive wheels are driven.

Thus, the inventors conceived of providing a meshing clutch that transfers a drive force through meshing between meshing teeth in the drive force transfer path for the electric motor. However, significant vibration or noise may be generated when the meshing teeth are meshed with each other, and a sense of discomfort may be given to a driver or a passenger.

SUMMARY OF THE INVENTION

It is an object of the present invention to provide an auxiliary drive device for a four-wheel-drive vehicle that transfers a drive force of an electric motor to auxiliary drive wheels via a meshing clutch and reduces vibration and noise at the time of meshing.

An aspect of the present invention provides an auxiliary drive device that drives auxiliary drive wheels of a four-wheel-drive vehicle including main drive wheels and the auxiliary drive wheels.

The auxiliary drive device includes:

a drive unit that has an electric motor that generates a drive force that matches a supplied current;

a meshing clutch that has a first meshing member including first meshing teeth and a second meshing member including second meshing teeth, and that allows and blocks torque transfer between the electric motor and the auxiliary drive wheels;

an actuator that causes the first meshing teeth and the second meshing teeth to be meshed with each other by moving the second meshing member in an axial direction with respect to the first meshing member; and a control unit that controls the electric motor and the actuator.

The actuator moves the second meshing member among a separation position, at which the first meshing teeth and the second meshing teeth are arranged side by side in the axial direction at a predetermined distance away from each other, an abutment position, at which distal end portions of the first meshing teeth and distal end portions of the second meshing teeth possibly abut against each other, and a meshing position, at which the first meshing teeth and the second meshing teeth are meshed with each other. The control unit makes a current supplied to the electric motor when the second meshing member is located between the abutment position and the meshing position smaller than a current required to maintain a rotational speed of the electric motor when the control unit controls the actuator so as to move the second meshing member from the separation position to the meshing position by way of the abutment position.

With the auxiliary drive device according to the aspect described above, it is possible to reduce vibration and noise at the time of meshing while a drive force of an electric motor is transferred to auxiliary drive wheels via a meshing clutch.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 4A to 4C schematically illustrate first meshing teeth and second meshing teeth as seen along the circumferential direction of a meshing clutch;

DETAILED DESCRIPTION OF EMBODIMENTS

An embodiment of the present invention will be described with reference to the drawings.

Figure 1:
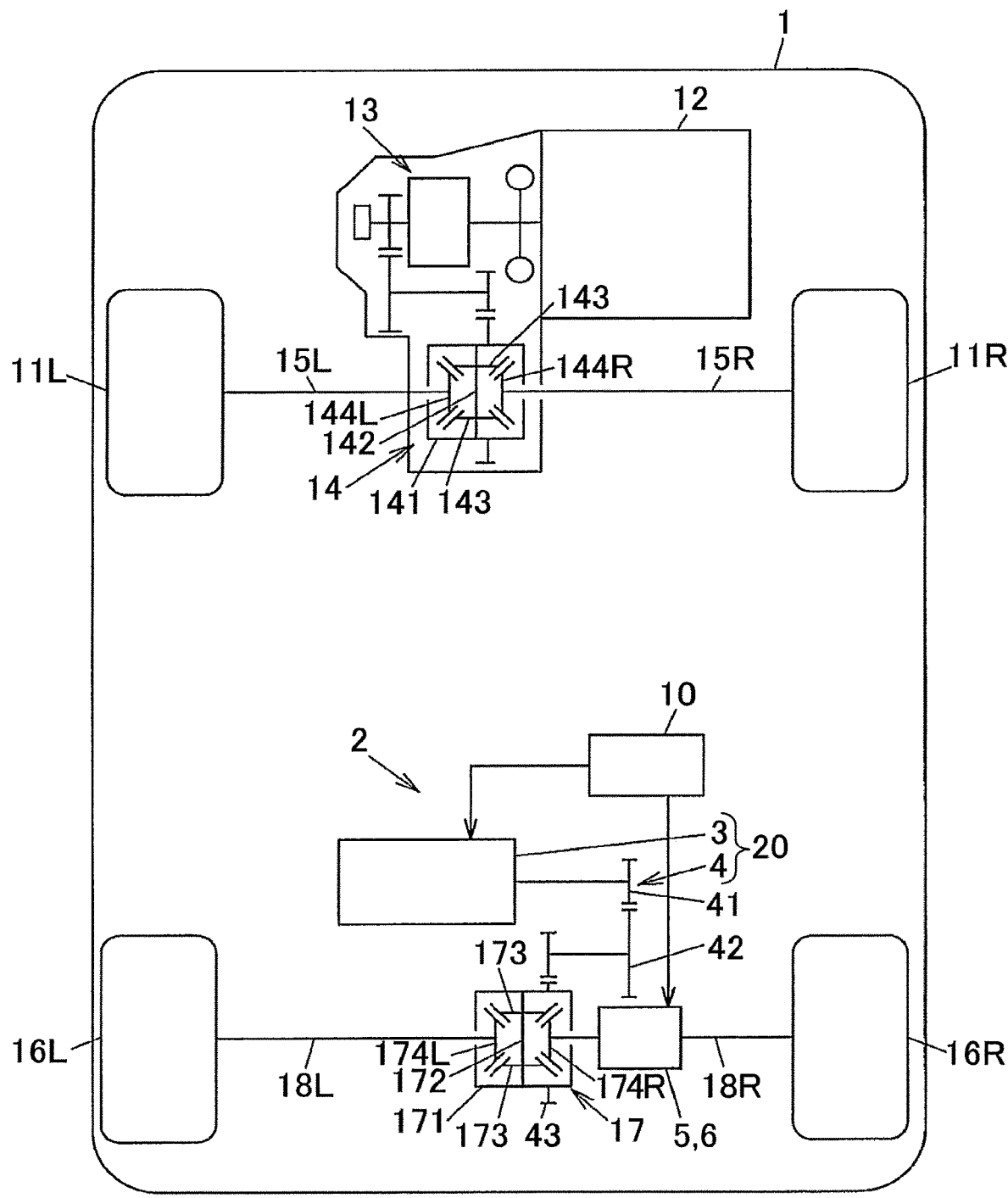
FIG. 1 is a schematic diagram illustrating an example of the configuration of a four-wheel-drive vehicle on which an auxiliary drive device according to an embodiment of the present invention is mounted.
Figure 2:
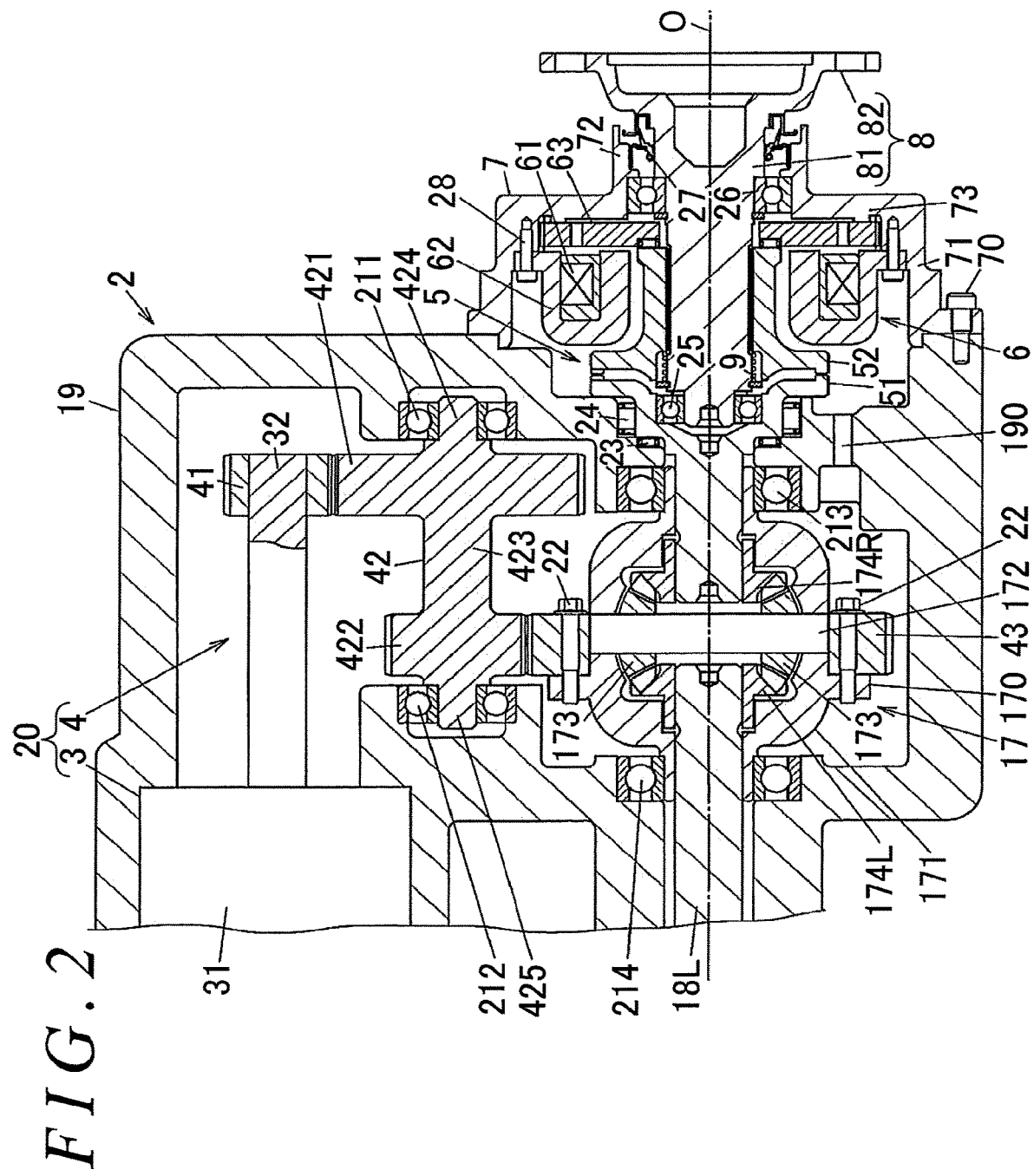
FIG. 2 is a sectional view illustrating an example of the configuration of a drive force transfer device.
Figure 3:
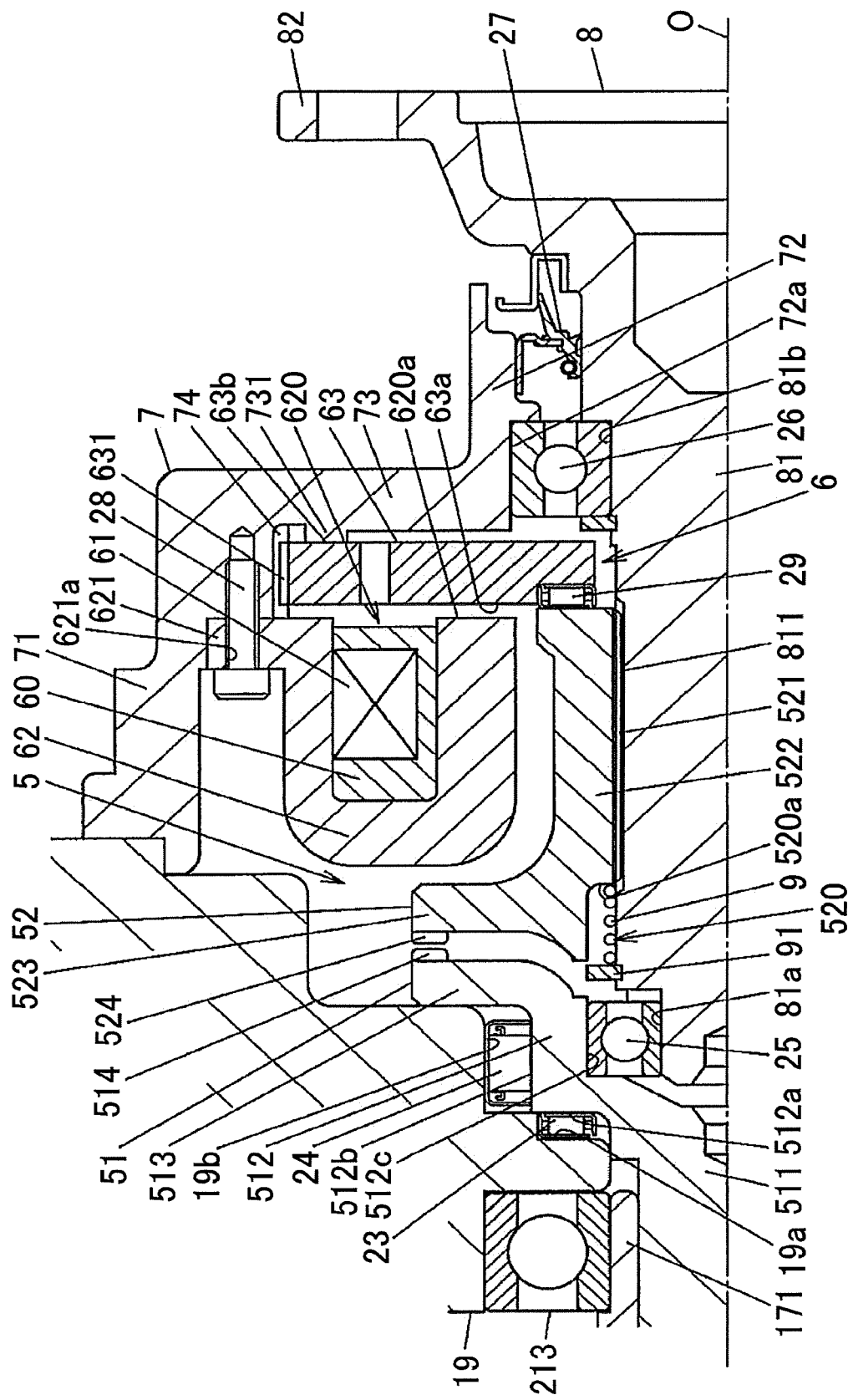
FIG. 3 is a partial enlarged view of FIG. 2, illustrating an essential portion of the drive force transfer device.

FIG. 1 is a schematic diagram illustrating an example of the configuration of a four-wheel-drive vehicle on which an auxiliary drive device according to an embodiment of the present invention is mounted. FIG. 2 is a sectional view illustrating an example of the configuration of a drive force transfer device. FIG. 3 is a partial enlarged view of FIG. 2, illustrating an essential portion of the drive force transfer device.

In a four-wheel-drive vehicle 1, right and left front wheels 11R and 11L are driven by an engine 12 that serves as a main drive source, and right and left rear wheels 16R and 16L are driven by an auxiliary drive device 2 that has an electric motor 3. In the present embodiment, the right and left front wheels 11R and 11L serve as main drive wheels, and the right and left rear wheels 16R and 16L serve as auxiliary drive wheels. In the following description, the terms "right" and "left" indicate the "right" and "left" sides, respectively, of the four-wheel-drive vehicle 1 in the vehicle width direction.

The drive force of the engine 12 is varied in speed by a transmission 13, and transferred to a differential case 141 of a front differential 14. The front differential 14 has: the differential case 141; a pinion shaft 142, both end portions of which are supported by the differential case 141; a pair of pinion gears 143 journaled by the pinion shaft 142; and a pair of side gears 144R and 144L meshed with the pinion gears 143 such that gear axes of the side gears 144R and 144L are each orthogonal to the pinion gears 143.

A drive shaft 15R that transfers a drive force to the right front wheel 11R is coupled to the right side gear 144R, of the pair of side gears 144R and 144L, so as not to be relatively rotatable, and a drive shaft 15L that transfers a drive force to the left front wheel 11L is coupled to the left side gear 144L so as not to be relatively rotatable.

As illustrated in FIG. 2, the auxiliary drive device 2 has: a drive unit 20 composed of the electric motor 3 and a speed reduction mechanism 4; a meshing clutch 5 that has first and second meshing members 51 and 52; an actuator 6 that moves the second meshing member 52 in the axial direction with respect to the first meshing member 51; a housing 7 that houses the second meshing member 52 and the actuator 6; a coupling shaft 8 rotatably supported by the housing 7; a return spring 9 constituted of a coil spring disposed at the outer periphery of the coupling shaft 8; and a control unit 10 (see FIG. 1) that controls the electric motor 3 and the actuator 6.

The electric motor 3 and the speed reduction mechanism 4 are housed in a differential carrier 19 together with a rear differential 17. Lubricating oil (not illustrated) is sealed in the differential carrier 19. A housing space for the rear differential 17 in the differential carrier 19 and a space inside the housing 7 are communicated with each other by a communication hole 190 formed in the differential carrier 19. The meshing clutch 5 and the actuator 6 are lubricated by the lubricating oil which flows through the communication hole 190.

The housing 7 has: an outer tubular portion 71 fixed to the differential carrier 19 by a bolt 70; an inner tubular portion 72 through which the coupling shaft 8 is inserted; and a wall portion 73 provided between the outer tubular portion 71 and the inner tubular portion 72. The outer tubular portion 71, the inner tubular portion 72, and the wall portion 73 are integral with each other. The actuator 6 is housed in the housing 7.

The rear differential 17 has: a differential case 171; a pinion shaft 172, both end portions of which are supported by the differential case 171; a pair of pinion gears 173 journaled by the pinion shaft 172; and a pair of side gears 174R and 174L meshed with the pinion gears 173 such that their gear axes of the side gears 174R and 174L are each orthogonal to the pinion gears 173. A drive shaft 18L that transfers a drive force to the left rear wheel 16L is coupled to the left side gear 174L, of the pair of side gears 174R and 174L, so as not to be relatively rotatable, and the first meshing member 51 is coupled to the right side gear 174R so as not to be relatively rotatable.

The electric motor 3 has: a motor case 31 that has a stator therein and that is fixed to the differential carrier 19; and a rotor shaft 32 that projects from the motor case 31. A rotational axis of the rotor shaft 32 extends along the vehicle width direction of the four-wheel-drive vehicle 1. The electric motor 3 is a DC brushless motor, for example, and generates a drive force that matches a current supplied from the control unit 10. The electric motor 3 has a speed sensor that detects the rotational speed of the rotor shaft 32. The control unit 10 can acquire the detection result of the speed sensor. The control unit 10 has a switching element that outputs DC power to the electric motor 3 by switching a DC power source such as a battery mounted on the four-wheel-drive vehicle 1, for example, and increases and decreases a current supplied to the electric motor 3 through pulse width modulation (PWM) control.

The speed reduction mechanism 4 has: a pinion gear 41 fixed to the rotor shaft 32 of the electric motor 3; a speed reduction gear 42 that is rotated upon receiving a drive force of the electric motor 3 from the pinion gear 41; and a ring gear 43 fixed to the differential case 171. The speed reduction gear 42 has: a large diameter gear portion 421 meshed with the pinion gear 41; a small diameter gear portion 422 meshed with the ring gear 43; a shaft portion 423 provided between the large diameter gear portion 421 and the small diameter gear portion 422; and boss portions 424 and 425 provided at both end portions in the axial direction. The large diameter gear portion 421, the small diameter gear portion 422, the shaft portion 423, and the boss portions 424 and 425 are integral with each other. In the speed reduction gear 42, the boss portion 424 is journaled by a ball bearing 211, and the boss portion 425 is journaled by a ball bearing 212. The ball bearings 211 and 212 are held by the differential carrier 19.

The pitch circle diameter of the large diameter gear portion 421 is larger than the pitch circle diameter of the pinion gear 41. The pitch circle diameter of the small diameter gear portion 422 is smaller than the pitch circle diameter of the large diameter gear portion 421. The pitch circle diameter of the ring gear 43 is larger than the pitch circle diameter of the small diameter gear portion 422. Consequently, rotation of the rotor shaft 32, which serves as the output shaft of the electric motor 3, is transferred to the differential case 171 with the speed of the rotation reduced by the speed reduction mechanism 4. The differential case 171 is provided with a flange portion 170 that projects radially outward. The ring gear 43 is fixed to the flange portion 170 by a plurality of bolts 22. The differential case 171 is rotatably supported by ball bearings 213 and 214 held by the differential carrier 19.

As illustrated in FIG. 3, the first meshing member 51 has: a shaft portion 511 in a circular column shape; a cylindrical portion 512 provided continuously with one end portion of the shaft portion 511; a rib portion 513 in a ring plate shape provided so as to project radially outward from the cylindrical portion 512; and a plurality of first meshing teeth 514 provided at a radially outer end portion of the rib portion 513. The other end portion of the shaft portion 511 is coupled so as not to be rotatable relative to the side gear 174R. The first meshing teeth 514 project in the axial direction from a surface of the rib portion 513 that faces the second meshing member 52.

The cylindrical portion 512 has an outside diameter that is larger than the outside diameter of the shaft portion 511, and projects radially outward from the shaft portion 511. A thrust roller bearing 23 is disposed between an axial end surface 512a of the cylindrical portion 512 and a receiving surface 19a of the differential carrier 19. Movement of the first meshing member 51 toward the rear differential 17 with respect to the differential carrier 19 is restricted by the thrust roller bearing 23. A cylindrical roller bearing 24 is disposed between an outer peripheral surface 512b of the cylindrical portion 512 and a receiving surface 19b of the differential carrier 19.

The coupling shaft 8 and the first meshing member 51 have a common rotational axis O. The coupling shaft 8 is disposed side by side with the first meshing member 51 in the axial direction. The coupling shaft 8 has: a shaft portion 81 inserted through the second meshing member 52; and a flange portion 82 disposed outside the housing 7. The shaft portion 81 and the flange portion 82 are integral with each other. A ball bearing 25 is disposed between an outer peripheral surface 81a of one end portion of the shaft portion 81 of the coupling shaft 8 and an inner peripheral surface 512c of the cylindrical portion 512 of the first meshing member 51. A ball bearing 26 is disposed between an outer peripheral surface 81b of the other end portion of the shaft portion 81 of the coupling shaft 8 and a receiving surface 72a of the inner tubular portion 72 of the housing 7.

Axial movement of the coupling shaft 8 with respect to the housing 7 is restricted by the ball bearing 26. Movement of the first meshing member 51 with respect to the differential carrier 19 away from the rear differential 17 is restricted by the ball bearing 25. A seal member 27 is disposed between an opening end portion of the inner tubular portion 72 of the housing 7 and the coupling shaft 8. A drive shaft 18R (see FIG. 1) that transfers a drive force to the right rear wheel 16R is coupled to the flange portion 82 of the coupling shaft 8 so as not to be relatively rotatable.

A plurality of spline protrusions 811 that extend in the axial direction are formed on a portion of the outer peripheral surface of the shaft portion 81 of the coupling shaft 8 between the ball bearing 25 and the ball bearing 26. A retention ring 91, against which one end portion of the return spring 9 abuts, is fitted with a portion of the outer peripheral surface of the shaft portion 81 on the first meshing member 51 side with respect to the plurality of spline protrusions 811.

The second meshing member 52 has: a cylindrical portion 522 that has a plurality of spline protrusions 521 on the inner peripheral surface thereof; a rib portion 523 in a ring plate shape provided so as to project radially outward from one end portion of the cylindrical portion 522; and a plurality of second meshing teeth 524 provided at a radially outer end portion of the rib portion 523. The second meshing teeth 524 project in the axial direction from a surface of the rib portion 523 that faces the first meshing member 51. The spline protrusions 521 of the second meshing member 52 are engaged with the spline protrusions 811 of the coupling shaft 8 in the circumferential direction. The second meshing member 52 is movable in the axial direction with respect to, and not rotatable relative to, the coupling shaft 8.

A housing portion 520 that houses the return spring 9 is formed in the cylindrical portion 522 of the second meshing member 52. The housing portion 520 is formed in a portion of the inner peripheral surface of the cylindrical portion 522 on which the spline protrusions 521 are not provided, and opens on the first meshing member 51 side. The other end portion of the return spring 9 abuts against an abutment surface 520a of the housing portion 520. The return spring 9 is compressed in the axial direction between the retention ring 91 and the abutment surface 520a of the second meshing member 52, and urges the second meshing member 52 in the direction away from the first meshing member 51.

When the first meshing teeth 514 of the first meshing member 51 and the second meshing teeth 524 of the second meshing member 52 are meshed with each other, the first meshing member 51 and the second meshing member 52 are engaged so as not to be relatively rotatable, and the first meshing member 51 and the drive shaft 18R are coupled so as not to be relatively rotatable via the second meshing member 52 and the coupling shaft 8. Consequently, a drive force is transferred from the right side gear 174R to the right rear wheel 16R. In addition, a drive force is transferred from the left side gear 174L to the left rear wheel 16L. That is, in a meshing state in which the first meshing teeth 514 and the second meshing teeth 524 are meshed with each other, a four-wheel-drive state is established. In the state, a drive force of the electric motor 3, which has been reduced in speed by the speed reduction mechanism 4, is distributed to the right and left rear wheels 16R and 16L by the rear differential 17 while differential motion is allowed.

In a two-wheel-drive state in which the electric motor 3 does not generate a drive force, on the other hand, meshing between the first meshing teeth 514 and the second meshing teeth 524 is released. When the four-wheel-drive vehicle 1 travels using the drive force of the engine 12 in the two-wheel-drive state, the left drive shaft 18L is rotated at the same speed and in the same direction as the left rear wheel 16L, and the right drive shaft 18R, the coupling shaft 8, and the second meshing member 52 are rotated at the same speed and in the same direction as the right rear wheel 16R. However, the first meshing member 51 is rotated in the direction opposite to that of the second meshing member 52, and the differential case 171 is not rotated. In this event, the right and left side gears 174R and 174L are rotated in directions opposite to each other, and thus the pinion gears 173 idle.

In this way, the meshing clutch 5 allows and blocks torque transfer between the electric motor 3 and the right and left rear wheels 16R and 16L. In the two-wheel-drive state in which the meshing clutch 5 is disengaged, the electric motor 3 is not rotated by rotation of the right and left rear wheels 16R and 16L, and thus a power loss due to rotation of the electric motor 3 and the speed reduction mechanism 4 is suppressed.

When one or both of the right and left front wheels 11R and 11L slip, for example, during travel in the two-wheeldrive state and it is necessary to transition to the four-wheel-drive state, meanwhile, the control unit 10 controls the actuator 6 so as to engage the meshing clutch 5 with the first meshing teeth 514 and the second meshing teeth 524 meshed with each other, and so as to cause the electric motor 3 to generate a drive force by supplying a current to the electric motor 3.

The actuator 6 has: an electromagnetic coil 61 that generates a magnetic force using an excitation current supplied from the control unit 10; an annular yoke 62 that holds the electromagnetic coil 61; and an armature 63 disposed side by side with the yoke 62 in the axial direction. The electromagnetic coil 61 is housed in a housing portion 620 of the yoke 62 as embedded in a molded resin 60. The yoke 62 has U-shapes in section and the housing portion 620 opens in the axial direction. A side surface 63a of the armature 63 on one side in the axial direction faces an opening end surface 620a of the housing portion 620 of the yoke 62. The yoke 62 is provided with a flange portion 621 for fixation to the housing 7. The yoke 62 is fixed to the housing 7 by bolts 28 inserted through bolt insertion holes 621a of the flange portion 621.

The armature 63 has a ring plate shape that allows the shaft portion 81 of the coupling shaft 8 to be inserted through the center portion of the armature 63. A plurality of spline protrusions 631 that extend in the axial direction are provided on the outer peripheral surface of the armature 63. The housing 7 is provided with a plurality of spline protrusions 74 to be engaged with the spline protrusions 631 of the armature 63 in the circumferential direction. With this configuration, the armature 63 is movable in the axial direction with respect to, and not rotatable relative to, the housing 7. A thrust roller bearing 29 is disposed between an end portion of the armature 63 on the radially inner side and an end portion of the cylindrical portion 522 of the second meshing member 52 on the opposite side from the rib portion 523.

When the electromagnetic coil 61 is not energized with no excitation current supplied, the armature 63 is pressed toward the wall portion 73 of the housing 7 by the urging force of the return spring 9 which is received via the second meshing member 52 and the thrust roller bearing 29. At this time, a side surface 63b of the armature 63 on the other side in the axial direction abuts against an abutment portion 731 provided on the wall portion 73 of the housing 7. Hereinafter, this position of the armature 63 will be referred to as an initial position.

When an excitation current is supplied from the control unit 10 to the electromagnetic coil 61, on the other hand, the armature 63 is moved toward the yoke 62 by the magnetic force of the electromagnetic coil 61. Along with this movement of the armature 63, the second meshing member 52 is moved toward the first meshing member 51 while compressing the return spring 9, and the second meshing teeth 524 are meshed with the first meshing teeth 514. Consequently, the meshing clutch 5 is engaged.

FIGS. 4A to 4C schematically illustrate the plurality of first meshing teeth 514 of the first meshing member 51 and the plurality of second meshing teeth 524 of the second meshing member 52 as seen along the circumferential direction of the meshing clutch 5. FIG. 4A illustrates a state in which the second meshing member 52 is located at a separation position at which the first meshing teeth 514 and the second meshing teeth 524 are arranged side by side in the axial direction at a predetermined distance away from each other. At this time, the armature 63 is located at the initial position. FIG. 4B illustrates a state in which the second meshing member 52 is located at an abutment position at which distal end portions 514a of the first meshing teeth 514 and distal end portions 524a of the second meshing teeth 524 possibly abut against each other. FIG. 4C illustrates a state in which the second meshing member 52 is located at a meshing position at which the first meshing teeth 514 and the second meshing teeth 524 are meshed with each other. The actuator 6 moves the second meshing member 52 in the axial direction among the separation position illustrated in FIG. 4A, the abutment position illustrated in FIG. 4B, and the meshing position illustrated in FIG. 4C.

It is desirable that the first meshing teeth 514 and the second meshing teeth 524 should be meshed with each other with rotation of the first meshing member 51 and rotation of the second meshing member 52 synchronized with each other. This is because, when there is a large difference in rotational speed between the first meshing member 51 and the second meshing member 52, meshing may not be achieved with the second meshing member 52 remaining located at the abutment position even if it is attempted to mesh the first meshing teeth 514 and the second meshing teeth 524 with each other, and a large shock (vibration or noise) may be caused to give a sense of discomfort to a driver or a passenger even if the first meshing teeth 514 and the second meshing teeth 524 are meshed with each other.

In the present embodiment, in order to immediately engage the meshing clutch 5 and also to suppress such a shock, the control unit 10 rotates the electric motor 3 to bring the rotational speed of the first meshing member 51 closer to the rotational speed of the second meshing member 52 when the first meshing teeth 514 and the second meshing teeth 524 are to be meshed with each other, and a current supplied to the electric motor 3 when the second meshing member 52 is located at the abutment position is made smaller than a current required to maintain the rotational speed of the electric motor 3 when the control unit 10 controls the actuator 6 so as to move the second meshing member 52 from the separation position to the meshing position by way of the abutment position.

More specifically, the control unit 10 performs synchronous control in which the first meshing member 51 and the second meshing member 52 are subjected to rotation synchronization by rotating the electric motor 3 at a speed corresponding to the rotational speed of the right and left rear wheels 16R and 16L when the first meshing teeth 514 and the second meshing teeth 524 are to be meshed with each other during travel of the four-wheel-drive vehicle 1 with the electric motor 3 stopped. The control unit 10 also continues the synchronous control until a predetermined time elapses since it is determined that the rotation synchronization is achieved and reduces a current supplied to the electric motor 3 after the predetermined time elapses when the actuator 6 is controlled so as to move the second meshing member 52 from the separation position to the abutment position. The control unit 10 reduces a current supplied to the electric motor 3 to a current corresponding to torque lost at the speed reduction mechanism 4 at least when the second meshing member 52 is located at the abutment position. In the present embodiment, a current supplied to the electric motor 3 is set to a current corresponding to torque lost at the speed reduction mechanism 4 when the second meshing member 52 is located between the abutment position and the meshing position.

Processing executed by the control unit 10 and operation of the auxiliary drive device 2 will be described in more detail below with reference to FIGS. 5 and 6.

Figure 5A:
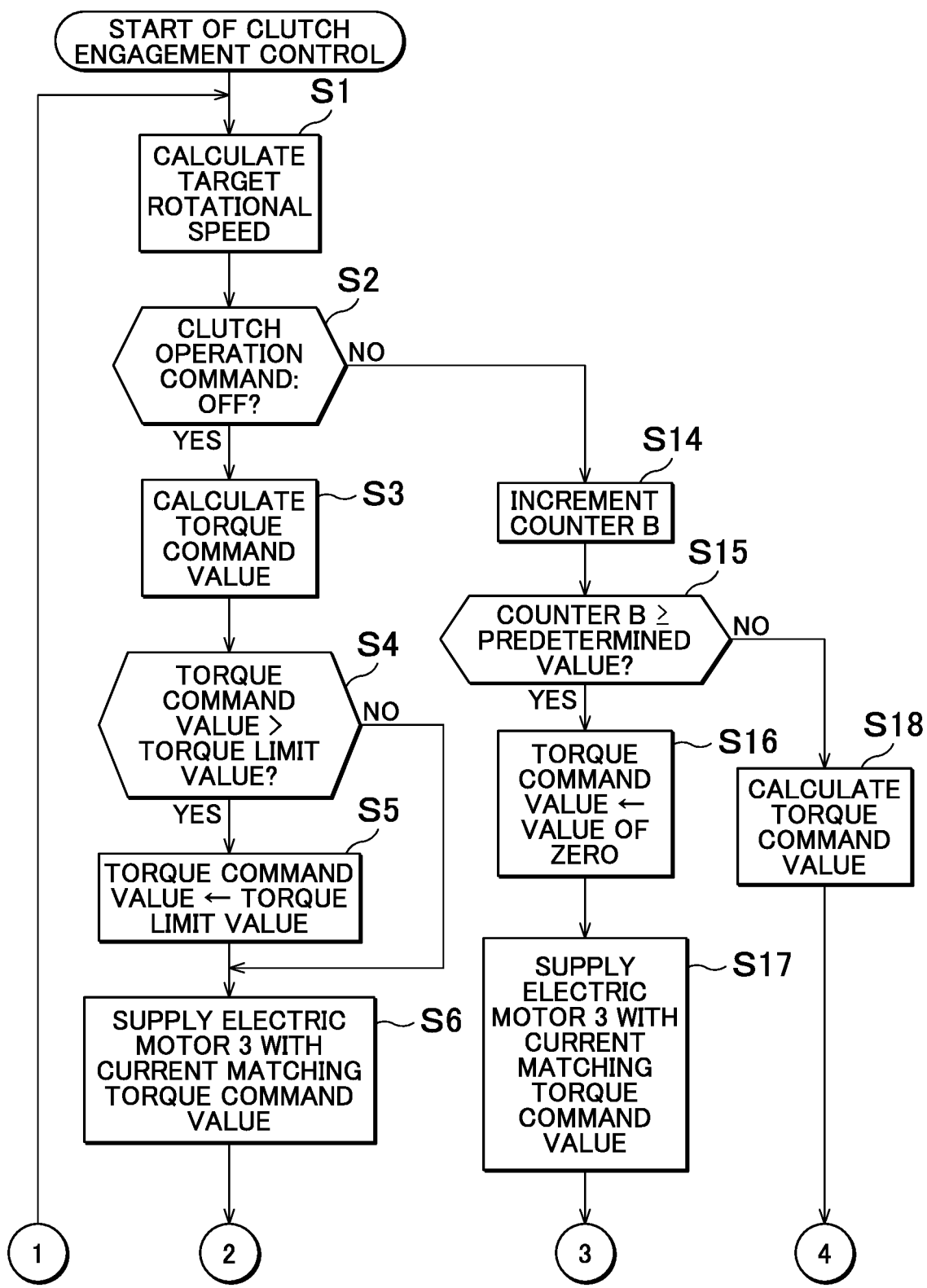
FIGS. 5A and 5B show a flowchart illustrating a specific example of processing executed by a control unit.
Figure 5B:
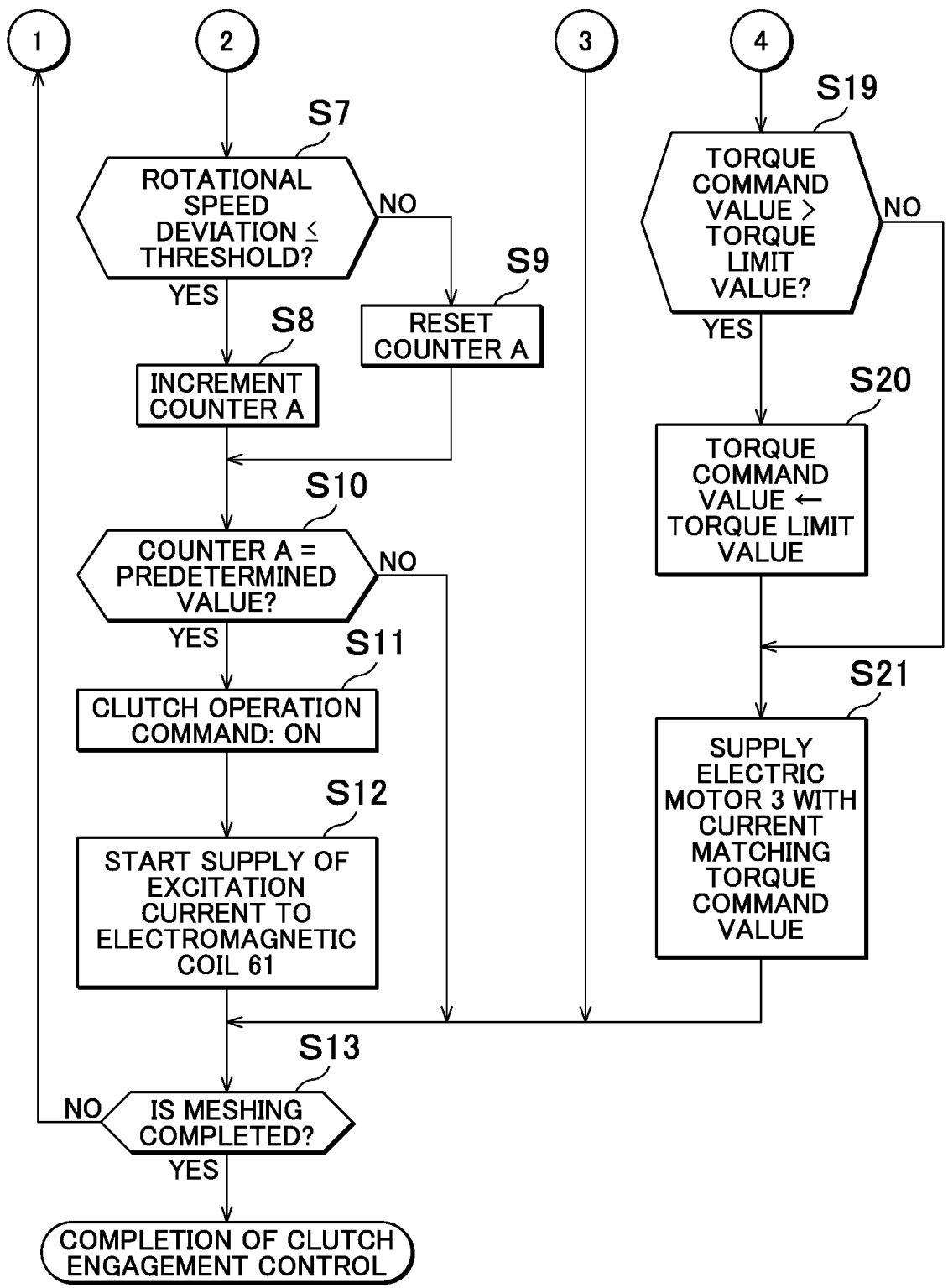

FIGS. 5A and 5B show a flowchart illustrating a specific example of processing executed by the control unit 10. The control unit 10 performs processing of the flowchart illustrated in FIGS. 5A and 5B by a computation processing device executing a program stored in a non-volatile memory. FIGS. 5A and 5B illustrate an example of processing executed by the control unit 10 when switching is made from the two-wheel-drive state to the four-wheel-drive state during travel of the four-wheel-drive vehicle 1.

The control unit 10 calculates a target rotational speed for the electric motor 3 on the basis of the rotational speed of the right and left rear wheels 16R and 16L, which is detected by a wheel speed sensor, when switching is made from the two-wheel-drive state, in which the electric motor 3 is stopped, to the four-wheel-drive state (step S1). This target rotational speed is the rotational speed of the electric motor 3 at the time when the rotational speed of the first meshing member 51 and the rotational speed of the second meshing member 52 coincide with each other in consideration of the speed reduction ratio of the speed reduction mechanism 4.

Next, the control unit 10 determines whether or not a clutch operation command, which is brought into an on state in the processing in step S11 to be discussed later, is in an off state (step S2). In the case where the clutch operation command is in the off state in this determination (S2: Yes), the control unit 10 calculates a torque command value, which is a command value for torque (drive force) to be generated by the electric motor 3, in accordance with a rotational speed deviation between the actual rotational speed of the electric motor 3, which is detected by a speed sensor, and the target rotational speed, which is calculated in step S1 (step S3). In the processing in step S3, the torque command value has a larger value as the rotational speed deviation is larger.

Next, the control unit 10 determines whether or not the torque command value, which is calculated in step S3, is more than a predetermined torque limit value (step S4). In the case where the torque command value is more than the torque limit value in this determination (S4: Yes), the control unit 10 sets the torque command value to the torque limit value (step S5). The processing in steps S4 and S5 is performed in order to mitigate abrupt acceleration of the electric motor 3 by limiting the torque command value so that vibration or noise generated during acceleration of the electric motor 3 is not sensed by the driver or the passenger. The processing in steps S4 and S5 may be omitted.

Next, the control unit 10 supplies a current to the electric motor 3 in accordance with the torque command value which is calculated in step S3 or the torque command value which is set to the torque limit value in the processing in step S5 (step S6).

Next, the control unit 10 determines whether or not the rotational speed deviation between the actual rotational speed of the electric motor 3, which is detected by the speed sensor, and the target rotational speed is equal to or less than a predetermined threshold (step S7). This threshold is such a value that allows considering that rotation synchronization between the first meshing member 51 and the second meshing member 52 in the meshing clutch 5 is achieved since the difference between the actual rotational speed of the electric motor 3 and the target rotational speed is so small.

Next, in the case where the rotational speed deviation is equal to or less than the threshold (S7: Yes), the control unit 10 adds one to (increments) a counter A that measures the time of continuation of a state that allows considering that rotation synchronization of the meshing clutch 5 is achieved (step S8). In the case where the rotational speed deviation is not equal to or less than the threshold (S7: No), on the other hand, the control unit 10 resets the counter A to zero (step S9).

Next, the control unit 10 determines whether or not the counter A indicates a predetermined value (step S10). If the counter A indicates the predetermined value (S10: Yes), the clutch operation command is brought into an on state (step S11), and supply of an excitation current to the electromagnetic coil 61 is started (step S12). Consequently, the actuator 6 is actuated so that the armature 63 is attracted toward the yoke 62 by a magnetic force generated by the electromagnetic coil 61.

Next, the control unit 10 determines whether or not meshing between the first meshing teeth 514 and the second meshing teeth 524 is completed (step S13). This determination may be made on the basis of a detection value of a sensor such as a proximity switch that can detect the position of the armature 63 or the second meshing member 52, for example, or may be made on the basis of an elapsed time after the clutch operation command is brought into the on state in the processing in step S11. In the case where meshing between the first meshing teeth 514 and the second meshing teeth 524 is not completed (S13: No), the control unit 10 executes the processing in step S1 and the subsequent steps again. The processing is repeatedly performed at predetermined control intervals (e.g. 5 ms). In the case where meshing between the first meshing teeth 514 and the second meshing teeth 524 is completed (S13: Yes), on the other hand, it is determined that a transition to the four-wheel-drive state is completed, and the processing of the flowchart illustrated in FIGS. 5A and 5B is ended.

In the case where the clutch operation command is in the on state in the determination in step S2 (S2: No), meanwhile, the control unit 10 adds one to (increments) a counter B that measures the elapsed time since the clutch operation command is brought into the on state (step S14). The counter B has been reset in advance when control for switching from the two-wheel-drive state to the four-wheel-drive state is started.

Next, the control unit 10 determines whether or not the counter B indicates a predetermined value or more (step S15). The predetermined value in step S15 is such a value that makes the result of determination in step S15 true (Yes) in a time that is shorter than a time required for the second meshing member 52 to reach the abutment position from the separation position after the actuation of the actuator 6.

In the case where the counter B indicates a value that is equal to or more than the predetermined value (S15: Yes), the control unit 10 sets the torque command value to a value of zero irrespective of the actual rotational speed of the electric motor 3 (step S16). The value of zero is a torque value corresponding to torque lost at the speed reduction mechanism 4 along with rotation of the rotor shaft 32. The term "torque loss" refers to torque corresponding to a power loss due to meshing between gears of the speed reduction mechanism 4 and a bearing loss caused by the ball bearings 211 and 212. A drive force output from the drive unit 20 to the rear differential 17 is brought to substantially zero by setting the torque command value to a value of zero.

Next, the control unit 10 supplies the electric motor 3 with a current that matches the torque command value which is set to a value of zero in step S16 (step S17). The current which is supplied to the electric motor 3 as a result of the processing in step S17 is smaller than a current required to maintain the rotational speed of the electric motor 3, and the rotor shaft 32 of the electric motor 3 is decelerated. After that, the control unit 10 executes the determination processing in step S13. If meshing between the first meshing teeth 514 and the second meshing teeth 524 is not completed, the control unit 10 executes the processing in step S1 and the subsequent steps again.

In the case where the counter B indicates a value that is less than the predetermined value (S15: No), on the other hand, the control unit 10 calculates a torque command value for the electric motor 3 in accordance with the rotational speed deviation (step S18). In the processing in step S18, the torque command value has a larger value as the rotational speed deviation is larger. If the torque command value is more than the torque limit value, the torque command value is set to the torque limit value (steps S19 and S20), and a current is supplied to the electric motor 3 in accordance with the torque command value (step S21). After that, the control unit 10 executes the determination processing in step S13. The torque limit value which is used in steps S19 and S20 is the same as the torque limit value which is used in steps S4 and S5.

The processing in steps S18 to S21 is the same as the processing in steps S3 to S6 discussed earlier, and the content of the processing is synchronous control in which the first meshing member 51 and the second meshing member 52 are subjected to rotation synchronization by rotating the electric motor 3 at a speed corresponding to the rotational speed of the right and left rear wheels 16R and 16L. That is, in the present embodiment, synchronous control is continued until a predetermined time elapses since movement of the second meshing member 52 is started and a current supplied to the electric motor 3 is reduced after the predetermined time elapses when the actuator 6 is controlled so as to move the second meshing member 52 from the separation position to the abutment position.

FIGS. 6A to 6D are each a timing chart illustrating an example of operation of the auxiliary drive device 2 at the time when the control unit executes the processing of the flowchart illustrated in FIGS. 5A and 5B. The vertical axis of FIG. 6A indicates the rotational speed (motor speed) of the rotor shaft 32 of the electric motor 3. The vertical axis of FIG. 6B indicates command torque for the electric motor 3. The vertical axis of FIG. 6C indicates an excitation current (coil current) supplied to the electromagnetic coil of the armature 63. The vertical axis of FIG. 6D indicates the position of the second meshing member 52. The horizontal axes of FIGS. 6A to 6D indicate a common time.

In these timing charts, time $t_1$ indicates the time when clutch engagement control is started. After the command torque rises at time $t_1$, the rotational speed of the rotor shaft 32 is gradually increased. TR indicated on the vertical axis of FIG. 6A indicates the target rotational speed. TL indicated on the vertical axis of FIG. 6B indicates the torque limit value which is used in steps S4 and S5. Time $t_2$ is the time when the rotational speed deviation between the actual rotational speed of the electric motor 3 and the target rotational speed becomes equal to or less than a predetermined threshold and the counter A starts counting up.

Time $t_3$ is the time when the counter A counts up to a predetermined value and supply of an excitation current to the electromagnetic coil 61 is started. A duration of time $t_a$ from time $t_2$ to time $t_3$ is a stability determination time for determining that the rotational speed of the electric motor 3 is stable.

Time $t_4$ is the time when the counter B counts up to a predetermined value and the torque command value is set to a value of zero. A duration of time $t_b$ from time $t_3$ to time $t_4$ is a duration of time during which the synchronous control is continued since the clutch operation command is brought into the on state. After the torque command value is set to a value of zero at time $t_4$, the rotational speed of the electric motor 3 is gradually reduced. In the present embodiment, in this way, the synchronous control is continued until a predetermined time corresponding to the durations of time $t_a$ and $t_b$ elapses since the rotational speed deviation becomes equal to or less than a predetermined threshold and it is determined that rotation synchronization is achieved in the meshing clutch 5 at time $t_2$, and a current supplied to the electric motor 3 is reduced to a value of zero after the predetermined time elapses.

Figure 6A:
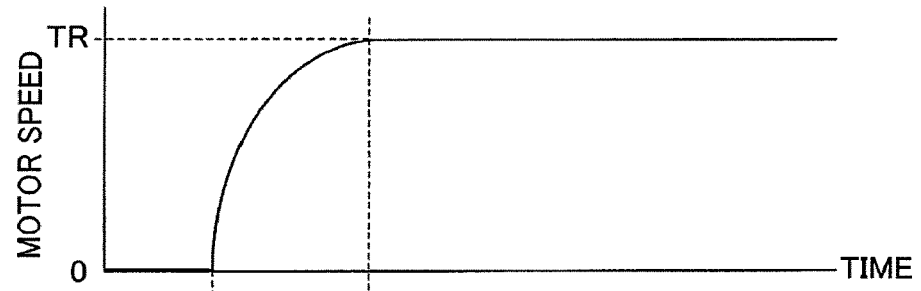
FIGS. 6A to 6D are each a timing chart illustrating an example of operation of the auxiliary drive device.
Figure 6B:
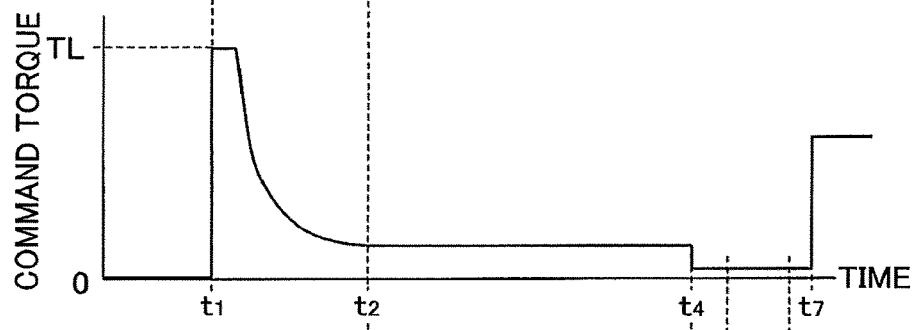
Figure 6C:
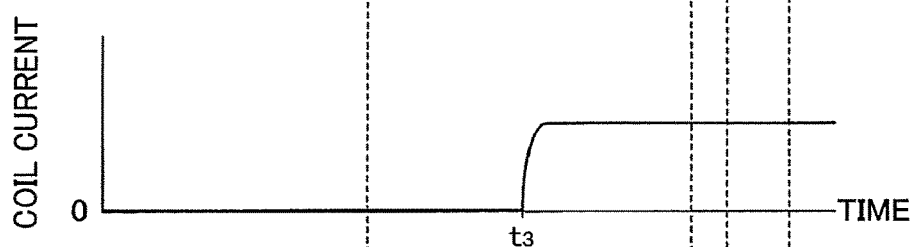
Figure 6D:
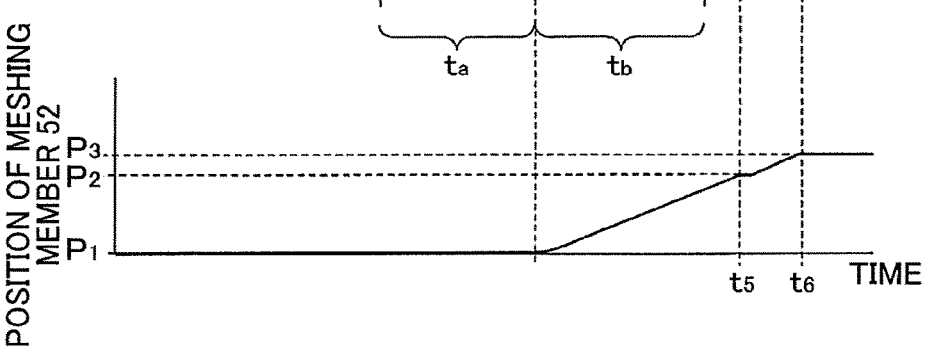

$P_1$, $P_2$, and $P_3$ indicated on the vertical axis of FIG. 6D indicate the separation position, the abutment position, and the meshing position, respectively, of the second meshing member 52. The second meshing member 52 is located at the separation position at and before time $t_3$ when supply of an excitation current to the electromagnetic coil 61 is started. When an excitation current is supplied to the electromagnetic coil 61, the second meshing member 52 starts moving toward the abutment position. The second meshing member 52 reaches the abutment position at time $t_5$ after the torque command value for the electric motor 3 reaches a value of zero at time $t_4$. Thereafter the second meshing member 52 reaches the meshing position at time $t_6$ with the torque command value remaining at a value of zero.

After it is detected that meshing between the first meshing teeth 514 and the second meshing teeth 524 is completed at time $t_7$, the torque command value is set to a value that matches a drive force to be transferred to the right and left rear wheels 16R and 16L in accordance with the travel state of the four-wheel-drive vehicle 1. Consequently, the four-wheel-drive vehicle 1 is brought into the four-wheel-drive state. The time from time $t_2$ to time $t_7$ is 0.2 to 0.3 seconds, for example.

In the present embodiment described above, when the second meshing member 52 is moved from the separation position to the abutment position, a current supplied to the electric motor 3 when the second meshing member 52 is located at the abutment position is made smaller than a current required to maintain the rotational speed of the electric motor 3. Thus, the rotational speeds of the electric motor 3 and constituent members of the speed reduction mechanism 4 and the rear differential 17 are easily varied so as to follow meshing between the first meshing teeth 514 and the second meshing teeth 524, which suppresses a shock caused when such meshing is established.

That is, when the first meshing teeth 514 and the second meshing teeth 524 are meshed with each other, the rotational speed of the first meshing member 51 and the rotational speed of the second meshing member 52 completely coincide with each other. Thus, the rotational speeds of the first meshing member 51 and the side gear 174R which is coupled thereto may be temporarily abruptly varied. If the electric motor 3 is generating a large drive force at this time, an impulsive torsional force may act on the constituent members of the rear differential 17 and the speed reduction mechanism 4, and a tooth hammering sound or vibration may be generated by the resilient force of such constituent members. In the present embodiment, a current supplied to the electric motor 3 has been reduced when the second meshing member 52 reaches the abutment position, which suppresses such an abnormal sound and vibration.

When the second meshing member 52 is moved to the abutment position, the rotational speed of the first meshing member 51 and the rotational speed of the second meshing member 52 coincide with each other. If such a state continues, the first meshing teeth 514 and the second meshing teeth 524 may not be meshed with each other with the distal end portions 514a of the first meshing teeth 514 and the distal end portions 524a of the second meshing teeth 524 abutting against each other as illustrated in FIG. 4B. In the present embodiment, however, the electric motor 3 has been decelerated when the second meshing member 52 is moved to the abutment position. Thus, a state in which the rotational speed of the first meshing member 51 and the rotational speed of the second meshing member 52 completely coincide with each other is not continued, and the first meshing teeth 514 and the second meshing teeth 524 can be immediately meshed with each other.

In the present embodiment, when the second meshing member 52 is moved from the separation position to the abutment position, the synchronous control is continued until a predetermined time elapses since it is determined that the rotation synchronization is achieved, and a current supplied to the electric motor 3 is reduced after the predetermined time elapses. Thus, the difference in rotational speed between the first meshing member 51 and the second meshing member 52 at the time when the second meshing member 52 is moved to the abutment position can be made small compared to a case where a current supplied to the electric motor 3 is reduced at the same time as the clutch operation command is brought into the on state, for example. Accordingly, the first meshing teeth 514 and the second meshing teeth 524 can be smoothly meshed with each other.

In the present embodiment, a current supplied to the electric motor 3 when the second meshing member 52 is located at the abutment position is set to a current corresponding to torque lost at the speed reduction mechanism 4. Thus, the effect in suppressing an abnormal sound and vibration can be obtained more reliably. Supply of a current to the electric motor 3 may be interrupted when the second meshing member 52 is located at the abutment position. It should be noted, however, that variations in rotational speed of the first meshing member 51 before meshing is established are made gentler by supplying the electric motor 3 with a current corresponding to the torque lost at the speed reduction mechanism 4 when the second meshing member 52 is located at the abutment position, which allows meshing between the first meshing teeth 514 and the second meshing teeth 524 to be established more smoothly.

The present invention can be modified, as appropriate, without departing from the scope and spirit of the present invention. For example, in the embodiment described above, the torque limit value which is used in steps S5, S6, S19, and S20 during execution of the synchronous control is a predetermined value determined in advance. However, the present invention is not limited thereto, and the torque limit value may be varied in accordance with the actual rotational speed of the electric motor 3 at that time. In this case, it is desirable that the torque limit value should be larger as the actual rotational speed of the electric motor 3 is higher. The torque limit value may be varied in accordance with the elapsed time since the start of the synchronous control. In this case, it is desirable that the torque limit value should be larger as the elapsed time since the start of the synchronous control is longer.

The configuration of the four-wheel-drive vehicle 1 can be changed as appropriate. For example, the main drive source which drives the right and left front wheels 11R and 11L which serve as the main drive wheels may be constituted of a high-power electric motor such as an interior permanent magnet (IPM) synchronous motor or a combination of the high-power electric motor and an engine which is an internal combustion engine, for example.

What is claimed is:

1. An auxiliary drive device that drives auxiliary drive wheels of a four-wheel-drive vehicle including main drive wheels and the auxiliary drive wheels, the device comprising:
   a drive unit that has an electric motor that generates a drive force that matches a supplied current;
   a meshing clutch that has a first meshing member including first meshing teeth and a second meshing member including second meshing teeth, and that allows and blocks torque transfer between the electric motor and the auxiliary drive wheels;
   an actuator that causes the first meshing teeth and the second meshing teeth to be meshed with each other by moving the second meshing member in an axial direction with respect to the first meshing member; and
   a control unit that controls the electric motor and the actuator, wherein:
   the actuator moves the second meshing member among a separation position, at which the first meshing teeth and the second meshing teeth are arranged side by side in the axial direction at a predetermined distance away from each other, an abutment position, at which distal end portions of the first meshing teeth and distal end portions of the second meshing teeth possibly abut against each other, and a meshing position, at which the first meshing teeth and the second meshing teeth are meshed with each other; and
   the control unit makes a current supplied to the electric motor when the second meshing member is located between the abutment position and the meshing position smaller than a current required to maintain a rotational speed of the electric motor when the control unit controls the actuator so as to move the second meshing member from the separation position to the meshing position by way of the abutment position.

2. The auxiliary drive device according to claim 1, wherein
   the control unit performs synchronous control in which the first meshing member and the second meshing member are subjected to rotation synchronization by rotating the electric motor at a speed corresponding to a rotational speed of the auxiliary drive wheels when the first meshing teeth and the second meshing teeth are to be meshed with each other during travel of the four-wheel-drive vehicle with the electric motor stopped, and continues the synchronous control until a predetermined time elapses since it is determined that the rotation synchronization is achieved and reduces a current supplied to the electric motor after the predetermined time elapses when the actuator is controlled so as to move the second meshing member from the separation position to the abutment position.

3. The auxiliary drive device according to claim 1, wherein:
   the drive unit has the electric motor and a speed reduction mechanism that reduces a speed of rotation of a rotor shaft of the electric motor; and
   the control unit sets a current supplied to the electric motor when the second meshing member is located at the abutment position to a current corresponding to torque lost at the speed reduction mechanism.

4. The auxiliary drive device according to claim 2, wherein:

the drive unit has the electric motor and a speed reduction mechanism that reduces a speed of rotation of a rotor shaft of the electric motor; and the control unit sets a current supplied to the electric motor when the second meshing member is located at the abutment position to a current corresponding to torque lost at the speed reduction mechanism.

\* \* \* \* \*